(12) United States Patent
Kaikkonen et al.

(10) Patent No.: US 10,200,895 B2
(45) Date of Patent: Feb. 5, 2019

(54) RADIO LINK MONITORING METHODS FOR WIRELESS SYSTEMS WITH MULTIPLE COVERAGE LEVELS

(71) Applicant: Nokia Solutions and Networks Oy, Espoo (FI)

(72) Inventors: Jorma Johannes Kaikkonen, Oulu (FI); Lars Dalsgaard, Oulu (FI); Ren Da, Warren, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 147 days.

(21) Appl. No.: 15/233,391

(22) Filed: Aug. 10, 2016

(65) Prior Publication Data
US 2018/0049053 A1    Feb. 15, 2018

(51) Int. Cl.
| | |
|---|---|
| *H04J 3/06* | (2006.01) |
| *H04W 24/08* | (2009.01) |
| *H04W 24/10* | (2009.01) |
| *H04W 56/00* | (2009.01) |

(52) U.S. Cl.
CPC ........... *H04W 24/08* (2013.01); *H04W 24/10* (2013.01); *H04W 56/00* (2013.01)

(58) Field of Classification Search
CPC ...... H04W 20/08; H04W 20/10; H04W 56/00
USPC ............... 370/252, 328–330, 335–345, 350, 370/503–519
See application file for complete search history.

(56) References Cited

U.S. PATENT DOCUMENTS

2017/0230780 A1* 8/2017 Chincholi ............... H04W 4/70

* cited by examiner

*Primary Examiner* — Thai D Hoang
(74) *Attorney, Agent, or Firm* — Harrington & Smith

(57) ABSTRACT

A method, apparatus, and computer program product where a user equipment, in a wireless communications system, measures downlink radio quality based on available downlink signals. The user equipment compares the measured downlink radio quality with RLM thresholds. Based on that comparison, the user equipment determines its in-sync or out-of-sync status. Prior to the measuring, the user equipment can determine the RLM thresholds based on hypothetical NPDCCH channels; can receive in-sync and out-of-sync thresholds from the base station; can receive an additional offset for in-sync and out-of-sync thresholds under enhanced coverages and can determine the RLM thresholds for normal converge on the hypothetical NPDCCH channels; or can receive an offset between in-sync and out-of-sync thresholds from a base station and determine the RLM out-of-sync threshold based on the hypothetical NPDCCH channels and the RLM in-of-sync threshold based on the out-of-sync threshold and the offset provided by the base station.

15 Claims, 7 Drawing Sheets

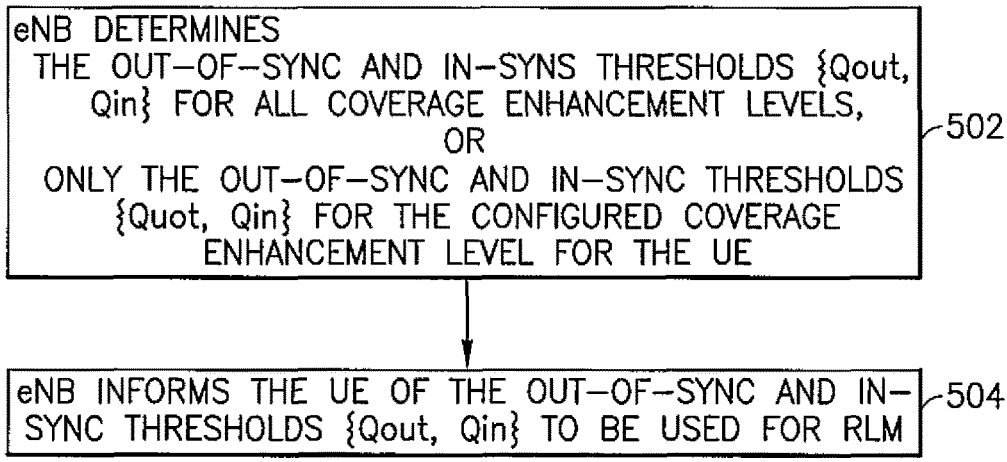

RADIO LINK MONITORING METHODS FOR WIRELESS SYSTEMS WITH MULTIPLE COVERAGE LEVELS

TECHNICAL FIELD

This invention relates generally to wireless communication systems and, more specifically, relates to radio link monitoring methods for wireless communication systems with multiple coverage levels.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

For reliable and efficient communication in a wireless system, a UE is required to continuously monitor its downlink radio link conditions and determine whether it is in out-of-sync or in in-sync status when a UE is in the connected state. The procedure is commonly called Radio Link Monitoring (RLM). For legacy E-UTRAN systems, all UEs work under the same cell coverage level, which is normally predetermined by careful cell-planning during the feature deployment. Conventional RLM is Thus designed and implemented to support one cell coverage level.

3GPP introduced enhanced machine type communication (eMTC) and narrow-band Internet of Things (NB-IoT), which are believed to be the baseline, or at least used as input, for 5G massive machine type communication (mMTC) and 5G Internet of Things (5G-IoT). Unlike legacy E-UTRAN systems, where there is only one cell coverage level and the cell coverage level is predetermined by careful cell-planning during the feature deployment, eMTC and NB-IoT features support multiple coverage levels. It is expected that multiple coverage levels will also be supported for mMTC and 5G-IoT features.

According to similar principles as for LTE, eMTC and NB-IoT devices are required to monitor the downlink radio link quality and determine their In-sync and Out-of-sync status. That is, if the DL quality falls below predefined threshold $Q_{out}$, UE is expected to declare it is in out-of-sync status, which may eventually trigger Radio Link Failure (RLF). For a UE already in out-of-sync status, it is expected to declare it comes back to in-sync status, if the DL quality exceeds another predefined threshold $Q_{in}$ to avoid unnecessarily triggering RLF. Since eMTC and NB-IoT support multiple coverage levels, the RLM for eMTC and NB-IoT is therefore required to support multiple cell coverage levels.

The current invention moves beyond these techniques and materials.

Abbreviations that may be found in the specification and/or the drawing figures are defined below, after the detailed description section.

BRIEF SUMMARY

This section is intended to include examples and is not intended to be limiting.

Considering that more features and more new features, including eMTC, NB-IoT, and future mMTC and 5G-IoT systems, need to support multiple cell coverage levels, it is critical to have more efficient and effective RLM methods to support these features. This invention involves innovative RLM methods for wireless systems with multiple cell coverage levels.

An example of an embodiment of the current invention is a method that comprises a user equipment in a wireless communications system measuring downlink radio quality based on available downlink signals, comparing the measured downlink radio quality with RLM thresholds, and determining its' in-sync or out-of-sync status based on that comparison.

One aspect of this invention is a further embodiment where the method comprises, prior to the measuring, the user equipment determining the RLM thresholds based on hypothetical NPDCCH channels, where the hypothetical NPDCCH channels are defined based on all configured NPDCCH parameters.

A second aspect of this invention is a further embodiment where the method comprises, prior to the measuring, the user equipment receiving from a base station in-sync and out-of-sync thresholds to be used for the RLM, where the in-sync and out-of-sync thresholds were determined by the base station for in-sync and out-of-sync thresholds for all coverage enhancement levels, or only the in-sync and out-of-sync thresholds for the configured coverage enhancement level for the UE.

A third aspect of this invention is a further embodiment where the method comprises, prior to the measuring, the user equipment receiving from a base station an additional offset for in-sync and out-of-sync thresholds under enhanced coverage, where the determining by the user equipment in-sync or out-of-sync status comprises considering the additional offset when the user equipment works under enhanced coverage, and determining by the user equipment the RLM thresholds for normal converge on the hypothetical NPDCCH channels.

A fourth aspect of this invention is a further embodiment where the method comprises, prior to the measuring, the user equipment receiving from a base station an offset between in-sync and out-of-sync thresholds; and the user equipment determining the RLM out-of-sync threshold based on the hypothetical NPDCCH channels and the RLM in-of-sync threshold based on the out-of-sync threshold and the offset provided by the base station.

An example of another embodiment of the present invention is an apparatus comprising means for performing the methods of any of the previously mentioned embodiments above.

An example of another embodiment of current invention, is an apparatus that comprises at least one processor and at least one memory including computer program code, such that the at least one memory and the computer program code are configured, with the at least one processor, to cause the apparatus to perform at least the measuring downlink radio quality based on available downlink signals, comparing the measured downlink radio quality with RLM thresholds, and based on the comparing, determining its in-sync or out-of-sync status based on the comparison.

A further example of an embodiment of the present invention is a computer program product comprising a non-transitory computer-readable medium bearing computer program code embodied therein for use with a computer. The computer program code comprises code that when executed by the computer at least performs or controls a method according any of the methods described herein.

BRIEF DESCRIPTION OF THE DRAWINGS

In the attached Drawing Figures:

FIGS. 5A and 5B are logic flow diagrams for radio link monitoring methods for wireless systems with multiple coverage levels, and illustrate the operation of an exemplary method, a result of execution of computer program instructions embodied on a computer readable memory, functions performed by logic implemented in hardware, and/or interconnected means for performing functions in accordance with exemplary embodiments;

DETAILED DESCRIPTION OF THE DRAWINGS

The exemplary embodiments herein describe techniques for RLM methods for wireless systems with multiple cell coverage levels. Additional description of these techniques is presented after a system into which the exemplary embodiments may be used is described. Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
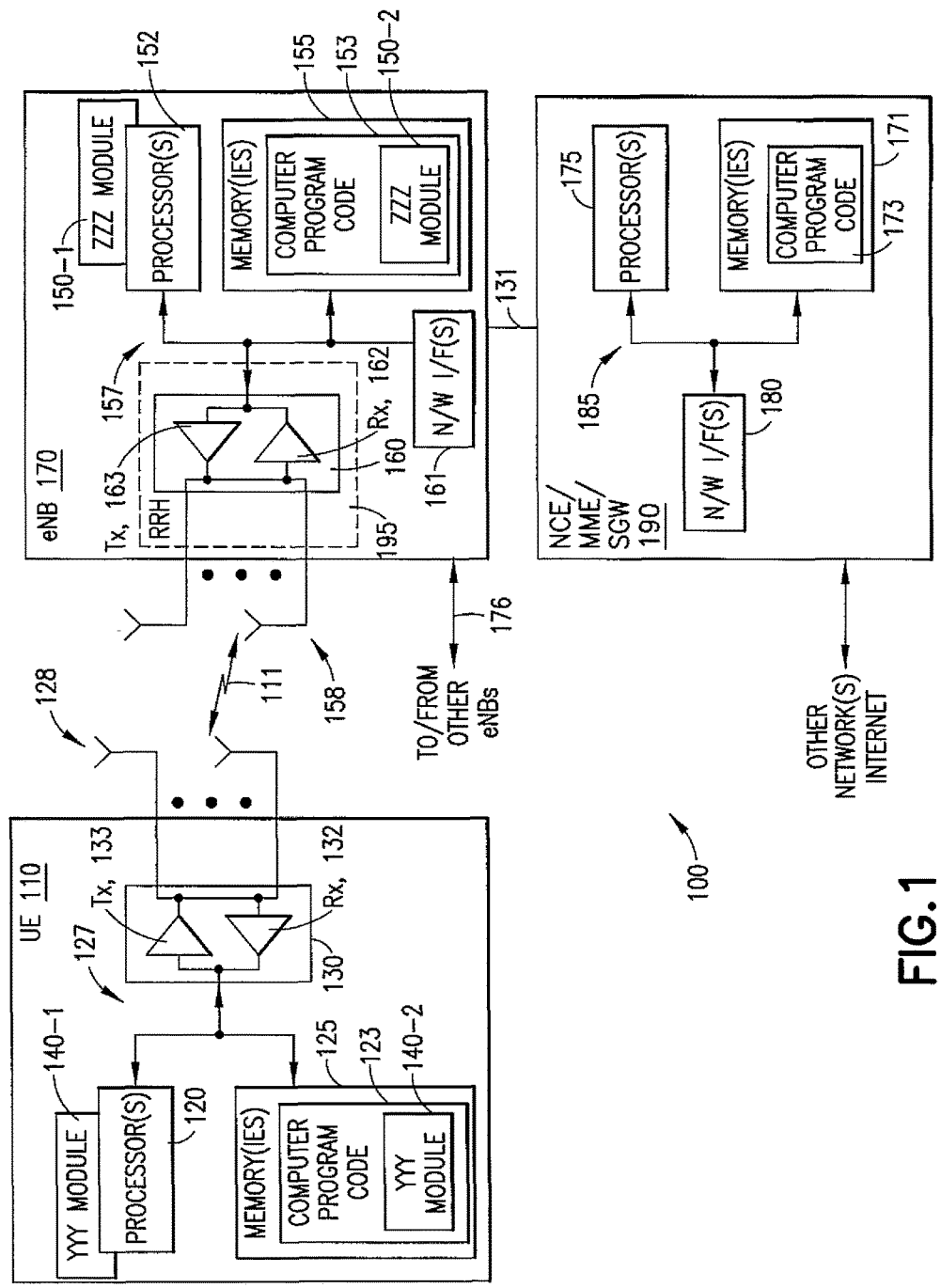
FIG. 1 is a block diagram of one possible and non-limiting exemplary system in which the exemplary embodiments may be practiced.

FIG. 1 shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Additionally, various embodiments of the eNB 170 as described herein could also be any device that serves the function of a base station and need not be restricted to the LTE version of a base station, namely, an eNB. Moreover, other devices in a wireless communication network, for instance, various other nodes such as gateways, relays, or other devices in some communications link with the network could also be substituted for the eNB, when "eNB" is mentioned or referred to herein. Furthermore, even references herein to a base station, could also include embodiments with other similarly situated devices or devices with similar functionalities or attributes in a wireless communication network, for instance, various other nodes such as gateways, relays, or devices with capabilities possessed by base station as described herein.

For legacy E-UTRAN systems, the UE determines its In-sync and Out-of-sync status based on one set of the thresholds $\{Q_{out}, Q_{in}\}$ suitable for one cell coverage level. Thus, if the downlink radio link quality falls below predefined threshold $Q_{out}$, then the UE will declare it is in out-of-sync status (out-of-coverage). An RLF will be declared if the UE stays in out-of-sync status longer than a predetermined period of time. For a UE already enters in out-of-sync status, it may declare coming back to in-sync status (in-coverage), if the downlink radio link quality exceeds another predefined threshold $Q_{in}$. For legacy RLM, the thresholds $Q_{out}$ and $Q_{in}$ correspond to 10% and 2% block error rate (BLER) of predefined, hypothetical physical downlink control channels (PDCCH).

Recently, the concept of multiple coverage levels was introduced, such as normal coverage and enhanced coverage, for supporting more advanced E-UTRAN features, such as eMTC and NB-IoT. In case of NB-IoT, the network can configure up to 3 sets of NPRACH resources that correspond to three different coverage levels. Based on the downlink RSRP measurements, a UE will select the NPRACH resource set to use, and through this procedure, the network and that UE can establish a common understanding on the coverage level.

With the introduction of the multiple coverage levels, one set of the thresholds $\{Q_{out}, Q_{in}\}$ is no longer enough, since for the same downlink radio link quality, a UE configured with normal coverage may already be in Out-of-sync status, while a UE configured with enhanced coverage may still be in In-Sync status. As different coverage levels typically result in different radio link configurations (to reach the coverage), using fixed thresholds to define $Q_{in}$ and $Q_{out}$ for Radio Link Monitoring does not work as UE would either trigger RLF too late or too soon.

For E-UTRAN systems with only one coverage level, TS 36.133 specifies RLM for 2 different scenarios—basic E-UTRAN and E-UTRAN Cat 0 UE. Radio link monitoring threshold setting is based on UE DL monitoring of the radio link in order to evaluate whether certain conditions are fulfilled or not. Many details are left for UE implementation but the basic principle is that the UE estimates the DL radio link quality based on the measurements of the CRS. If the DL radio link quality is estimated to be worse than a fixed threshold $Q_{out}$, which corresponds to an estimated block error rate (BLER) of 10% for an hypothetical PDCCH channel with DCI format 1A over a given period, then the device sends an Out-of-sync indication to upper layers. In a similar way—when the DL radio link quality over a given period is estimated to be better than a fixed threshold $Q_{in}$ which corresponds to an estimated BLER of 2% for a hypothetical PDCCH channel with DCI format 1C, then it sends In-sync indication to upper layers.

Similar to the legacy RLM with one coverage level, for the RLM for multiple coverage levels, the thresholds $\{Q_{out}, Q_{in}\}$ may be determined by hypothetical PDCCHs. For example, in NB-IoT RLM the out-of-sync and in-sync thresholds $\{Q_{out}, Q_{in}\}$ are determined based on hypothetical Narrowband PDCCHs (NPDCCHs). The term "hypothetical NPDCCH" is used to represent the hypothetical NPDCCH transmission, which is used purely for the UE to determine the out-of-sync and in-sync thresholds, $Q_{out}$ and $Q_{in}$, corresponding to 10% BLER and 2% BLER of the "hypothetical NPDCCH". In another words, "hypothetical NPDCCH" may not be the real NPDCCH transmission during RLM. When UE performs RLM in a real system, the network may or may not transmit NPDCCH, and if the NPDCCH is transmitted, the NPDCCH transmission may or may not have the same set of the NPDCCH parameters as defined in the "hypothetical NPDCCH". The parameters for the "hypothetical NPDCCH" are pre-defined in the standard and thus known to both UE and eNB. The transmission parameters of the hypothetical NPDCCHs may comprise parameters such as downlink control information (DCI) format, maximum NPDCCH repetition level, NPDCCH aggregation levels, deployment mode, etc.

Unlike legacy RLM, the RLM for multiple coverage levels cannot have all of the parameters associated in the hypothetical PDCCHs be fixed. Some parameters should be associated with the coverage levels in order to support multiple coverage levels. For example, in NB-IoT RLM the NPDCCH repetition level in the hypothetical NPDCCHs for out-of-sync and in-sync thresholds $\{Q_{out}, Q_{in}\}$ are Rmax and Rmax/4, respectively, where Rmax is the maximum NPDCCH repetition level configured by the network according to the coverage levels (R4-164901).

There are, however, there are a number of issues associated with the current RLM design for supporting multiple different coverage levels.

Regarding the NB-IoT RLM, for example, there are many configurable NPDCCH parameters that may impact the NPDCCH channel performance. However, in current NB-IoT RLM requirement, all NPDCCH parameters except NPDCCH repetition level are assumed to be fixed values to minimize the complexity in UE RLM implementation. The RLM performance is thus unavoidably degraded when the values of configured NPDCCH parameters differ from the fixed ones in hypothetical NPDCCHs.

Furthermore, in the NB-IoT RLM requirement at the time of this invention, the parameters of the hypothetical NPDCCHs for out-of-sync and in-sync thresholds $\{Q_{out}, Q_{in}\}$ are the same except for the NPDCCH repetition levels, which are $R_{max}$ for $Q_{out}$ and $R_{max}/4$ for $Q_{in}$. Since the signal to noise (SNR) level for 10% BLER and 2% BLER for the same hypothetical NPDCCH is about 4~5 dB based on the simulation results, and that the ratio of the NPDCCH repetition levels between $Q_{out}$ and $Q_{in}$ is 4 or about 6 dB, it is very likely that once a UE downlink radio quality is lower than $Q_{out}$ and enters Out-of-sync status, the UE will end up in a declared RLF, since it requires the downlink radio quality becoming equal to or greater than 10 dB better than the $Q_{out}$ before the RLM timer expires in order for the UE to return to In-Sync status. Consider NB-IoT targets to low or no mobility users, the NB-IoT RLM may not work effectively in most cases with requirements present at the time of this invention.

The invention presents multiple methods or embodiments regarding the determination of RLM out-of-sync and in-sync thresholds $\{Q_{out}, Q_{in}\}$.

How to properly set the out-of-sync and in-sync thresholds $\{Q_{out}, Q_{in}\}$ is key for designing the RLM for wireless systems supporting multiple coverage levels. In order to enable RLM to work properly for a UE under any of the configured coverage levels, it is important that RLM thresholds are defined applicable to the coverage level that the UE is configured or assumed to work with. In other words, the out-of-sync and in-sync thresholds $\{Q_{out}, Q_{in}\}$ shall be defined based on the coverage level related parameters.

Taking NB-IoT RLM as an example, during initially accessing the network/system, a UE is required to determine its coverage level and transmit the PRACH preambles with the PRACH resource corresponding to the determined coverage level. Based on the information obtained from PRACH procedure, eNB gets the information about the coverage the UE is operating under, where that level is determined by the UE. With the PRACH information and other factors, the eNB configures the NPDCCH parameters associated with the coverage level and sends the NPDCCH configuration to the UE. Therefore, NB-IoT RLM should not use fixed thresholds $Q_{in}$ and $Q_{out}$ based on all fixed hypothetical NPDCCH parameters.

Also, in the NB-IoT RLM requirement at the time of this invention, all NPDCCH parameters except the NPDCCH repetition level are assumed to be fixed values to minimize the complexity in UE RLM implementation. The main reason for existing NB-IoT RLM requirement only including one parameter, for instance, configured maximum NPDCCH repetitions associated with the coverage level while using the fixed values for other parameters, is due to the complexity of considering more parameters in the determination of the thresholds $Q_{in}$ and $Q_{out}$. Thus, under the existing equipment, NB-IoT RLM performance is degraded when the values of configured NPDCCH parameters differ from the fixed ones in hypothetical NPDCCHs thresholds $Q_{in}$ and $Q_{out}$. Therefore, the thresholds $Q_{in}$ and $Q_{out}$ should be determined by a function (or a formula) of some or all configured NPDCCH parameters to avoid RLM performance degradation.

An embodiment of the current invention is where a UE determines the out-of-sync and in-sync thresholds $\{Q_{out}, Q_{in}\}$ based on a unified function (or a formula) that is applicable to any of the coverage levels, where the RLM thresholds $\{Q_{out}, Q_{in}\}$ of the different coverage levels would be considered based on all configured NPDCCH parameters, not limited to the NPDCCH repetitions.

Another method for the determination of the out-of-sync and in-sync thresholds $\{Q_{out}, Q_{in}\}$ associated with any of the coverage levels is to let the eNB determine the out-of-sync and in-sync thresholds $\{Q_{out}, Q_{in}\}$ and then explicitly inform the UE of the out-of-sync and in-sync thresholds $\{Q_{out}, Q_{in}\}$ to be applicable to different coverage levels.

There are multiple advantages of letting eNB to determine the out-of-sync and in-sync thresholds $\{Q_{out}, Q_{in}\}$ and explicitly inform the UE the out-of-sync and in-sync thresholds $\{Q_{out}, Q_{in}\}$ for different coverage levels. One advantage is that it avoids the complexity on the UE-side to derive the out-of-sync and in-sync thresholds $\{Q_{out}, Q_{in}\}$ based on the configured NPDCCH parameters. Another advantage is that it helps avoid the inconsistency among UEs when different implementation methods may be used to derive the out-of-sync and in-sync thresholds $\{Q_{out}, Q_{in}\}$ based on the configured NPDCCH parameters. Yet a further advantage is that it gives the eNB the freedom to directly control the coverage level for a UE instead of using NPDCCH parameters to implicitly control the coverage level for the UE.

In another embodiment of the present invention, an eNB determines the out-of-sync and in-sync thresholds $\{Q_{out}, Q_{in}\}$ for all coverage levels or only the out-of-sync and in-sync thresholds $\{Q_{out}, Q_{in}\}$ for the configured coverage enhancement level for the UE. The eNB then informs the UE of the out-of-sync and in-sync thresholds $\{Q_{out}, Q_{in}\}$ to be used for RLM;

Another method for the determination of the out-of-sync and in-sync thresholds $\{Q_{out}, Q_{in}\}$ is to allow the UE to determine the out-of-sync and in-sync, thresholds $\{Q_{out}, Q_{in}\}$ under normal coverage and let the eNB inform the UE of the additional offsets that need to be consider when the UE is working under different coverage levels.

The advantages of this method is that in one hand, it allows the UE to determine the out-of-sync and in-sync thresholds $\{Q_{out}, Q_{in}\}$ for normal coverage based on fixed NPDCCH parameters without the need to consider various factors associated with the coverage enhancement. On the other hand, it allows the eNB to control the coverage enhancement level in comparison with the normal coverage.

In yet another embodiment of the present invention, a UE determines the out-of-sync and in-sync thresholds $\{Q_{out}, Q_{in}\}$ for the normal coverage, while eNB informs the UE the additional offset for the out-of-sync and in-sync thresholds $\{Q_{out}, Q_{in}\}$ under enhanced coverage levels.

Another method for the determination of the out-of-sync and in-sync thresholds $\{Q_{out}, Q_{in}\}$ is to allow the UE to determine the out-of-sync threshold $Q_{out}$ under normal or under enhanced coverages, and let the eNB inform the UE the additional offsets that need to be considered for in-sync threshold $Q_{in}$.

The advantages of this method is that, on one hand, it allows the UE to determine the out-of-sync threshold $Q_{out}$ for normal or enhanced coverage based on its implementation, which may make the thresholds more suitable for the UE's implementation, while allows the eNB to control the condition for a UE to come back to in-sync status in order to avoid the situation that once a UE enters out-of-sync status, it may no longer be able to enter the in-sync status, which is one of the main issues in current NB-IoT RLM.

In yet another embodiment of the current invention, a UE determines the out-of-sync threshold $Q_{out}$ for the normal and/or enhanced coverage, while the eNB informs the UE of the additional offset for in-sync thresholds $Q_{in}$ under that coverage level.

A combination of the above embodiments and/or methods may also be considered for the determination of the out-of-sync and in-sync thresholds $\{Q_{out}, Q_{in}\}$ for RLM. For the last three embodiments described above, the eNB may adjust the RLM thresholds based on network conditions in real time.

The invention also concerns the estimation of downlink radio quality.

The RLM performance also depends highly on UE's performance in the estimation of the DL quality. That is, the RLM reliability depends on whether the UE is capable of reliably determining the whether the DL quality is better or worse than the thresholds $Q_{in}$ and $Q_{out}$. Therefore, it is beneficial for the UE to perform the estimation of the DL quality based on the combined signals (e.g. combining the used signal using 'repetition' level amount of signals— whether this signal is NRS, NSSS or similar). The combined signal used for RLM should be based on combining the same amount of signals as is used the signaled repetition level. If no repetition level is signaled (for example, the UE is not scheduled) there would need to be a defined repetition level.

Figure 2:
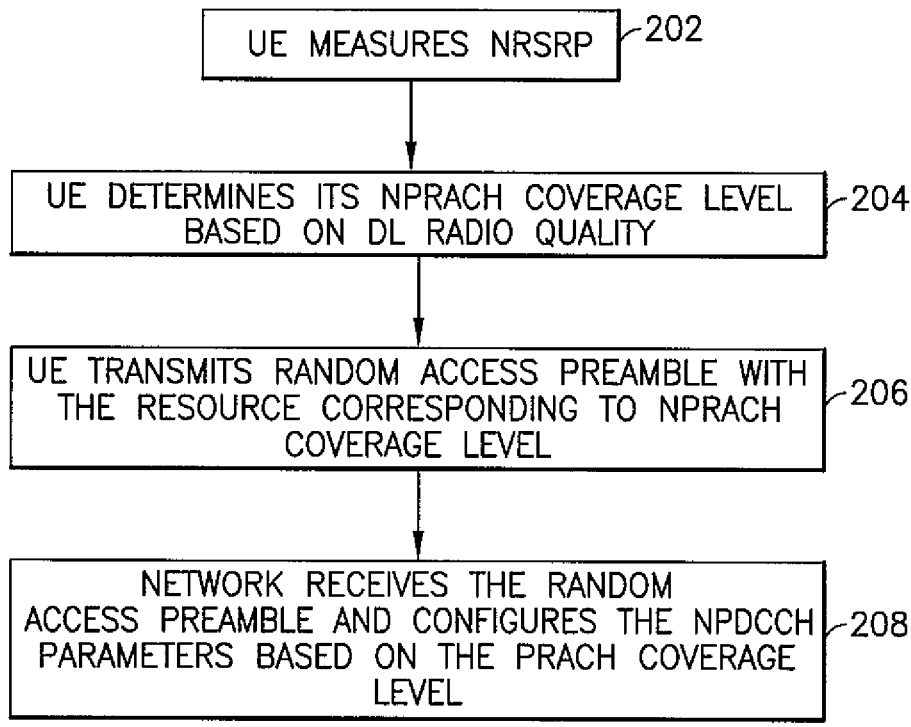
FIG. 2 is a logic flow diagram of actions taken during a connection set-up.

FIG. 2 is a logic flow diagram of actions taken during a connection set-up. Block 202 represents a UE measuring downlink radio quality (e.g., NRSRP). Block 204 represents the UE determining its NPRACH coverage level based on downlink radio quality (e.g., NRSRP). Block 206 represents the UE transmitting random access preamble with the resource corresponding to NPRACH coverage level. Block 208 represents the network receiving the random access preamble and configuring the NPDCCH parameters based on the PRACH coverage level.

Once these actions are taken during set-up, the procedures regarding RLM can be undertaken.

Figure 3:
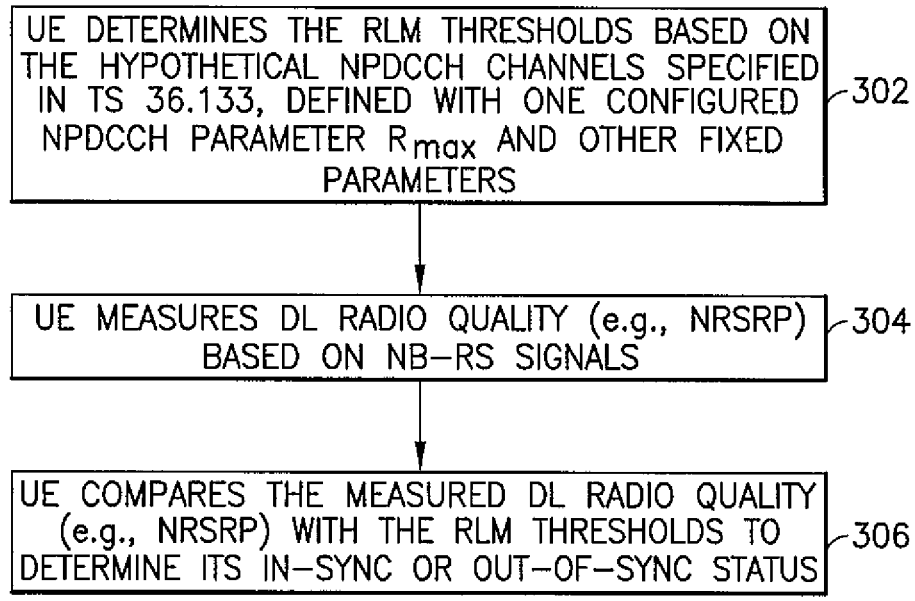
FIG. 3 is a logic flow diagram for RLM procedure based on the prior state of affairs using NB-IoT as an example.

FIG. 3 is a logic flow diagram for RLM procedure based on the prior state of affairs using NB-IoT as an example. Actions performed in UE for RLM begin with block 302 which represents determining the RLM thresholds based on the hypothetical NPDCCH channels specified in TS 36.133. The hypothetical NPDCCH channels are defined with one configured NPDCCH parameter Rmax and other fixed parameters.

In block 304, the UE measures DL radio quality (e.g., NRSRP) based on NB-RS signals.

This procedure concludes by UE represented in block 306 comparing the measured downlink radio quality (e.g., NRSRP) with the RLM thresholds to determine its in-sync or out-of-sync status.

An exemplary method, designated herein as exemplary method 1, for the determination of RLM out-of-sync and in-sync thresholds $\{Q_{out}, Q_{in}\}$ involves a UE determining the out-of-sync and in-sync thresholds $\{Q_{out}, Q_{in}\}$ based on a unified function (or a formula) that is applicable to any of the coverage levels, where the RLM thresholds $\{Q_{out}, Q_{in}\}$ of the different coverage levels will be considered based on all configured NPDCCH parameters, not limited to the NPDCCH repetitions. Exemplary method 1 is discussed in the context of FIG. 4.

Figure 4:
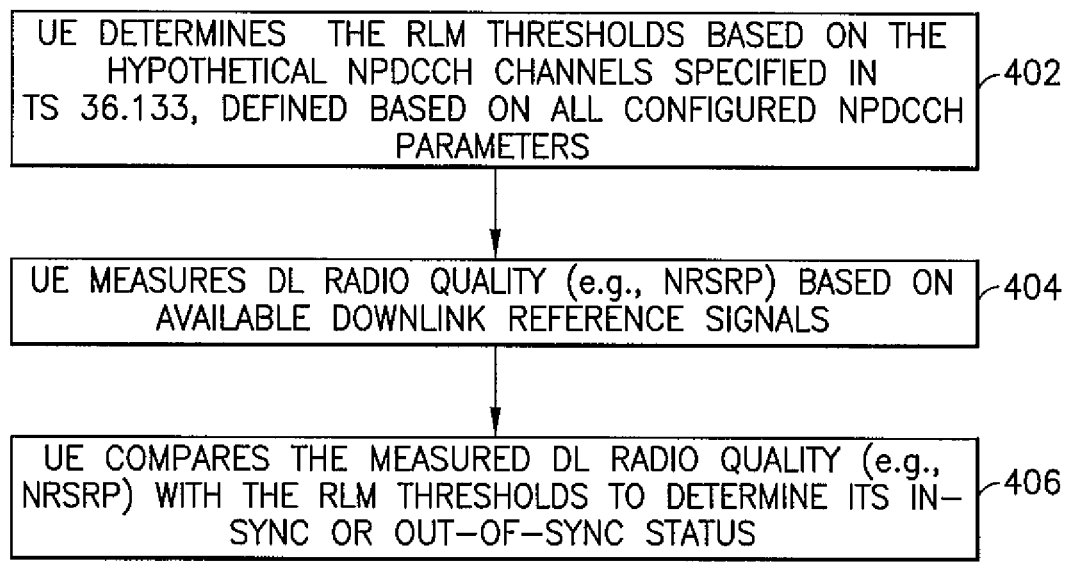
FIG. 4 is a logic flow diagram for radio link monitoring methods for wireless systems with multiple coverage levels, and illustrates the operation of an exemplary method, a result of execution of computer program instructions embodied on a computer readable memory, functions performed by logic implemented in hardware, and/or interconnected means for performing functions in accordance with exemplary embodiments.

FIG. 4 is a logic flow diagram for actions performed in UE for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 4, where each included block is an interconnected means for performing the function in the block. The blocks in FIG. 4 are assumed to be performed by the UE 110, e.g., under control of the YYY module 140 at least in part.

Block 402 represents the UE determining the RLM thresholds based on the hypothetical NPDCCH channels specified in TS 36.133. However, here the hypothetical NPDCCH channels are defined based on all configured NPDCCH parameters.

In block 404, the UE measures DL radio quality (e.g., NRSRP) based on available downlink reference signals.

This procedure also concludes by UE represented in block 406 comparing the measured downlink radio quality (e.g., NRSRP) with the RLM thresholds to determine its in-sync or out-of-sync status.

An exemplary method, designated herein as exemplary method 2, for the determination of RLM out-of-sync and in-sync thresholds $\{Q_{out}, Q_{in}\}$ involves a UE determining the out-of-sync and in-sync thresholds $\{Q_{out}, Q_{in}\}$ for all coverage levels or only the out-of-sync and in-sync thresholds $\{Q_{out}, Q_{in}\}$ for the configured coverage enhancement level for the UE. The eNB then informs the UE of the out-of-sync and in-sync thresholds $\{Q_{out}, Q_{in}\}$ to be used for RLM. Exemplary method 1 is discussed in the context of FIG. 5A and FIG. 5B.

FIG. 5A is a logic flow diagram for actions taken in eNB for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the ZZZ module 150 may include multiples ones of the blocks in FIG. 5A, where each included block is an interconnected means for performing the function in the block. The blocks in FIG. 5A are assumed to be performed by a base station such as eNB 170, e.g., under control of the ZZZ module 150 at least in part.

Block 502 represents the eNB determining the out-of-sync and in-sync thresholds $\{Q_{out}, Q_{in}\}$ for all coverage enhancement levels, or determining only the out-of-sync and in-sync thresholds $\{Q_{out}, Q_{in}\}$ for the configured coverage enhancement level for the UE.

In block 504, the eNB is represented informing the UE of the out-of-sync and in-sync thresholds $\{Q_{out}, Q_{in}\}$ to be used for RLM.

FIG. 5B is a logic flow diagram for actions performed in UE for RLM. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 5B, where each included block is an interconnected means for performing the function in the block. The blocks in FIG. 5B are assumed to be performed by the UE 110, e.g., under control of the YYY module 140 at least in part.

Block 512 represents the UE measuring DL radio quality (e.g., NRSRP) based on available downlink reference signals.

In block 514, UE is represented comparing the measured downlink radio quality (e.g., NRSRP) with the RLM thresholds to determine its in-sync or out-of-sync status.

An exemplary method, designated herein as exemplary method 3, for the determination of RLM out-of-sync and in-sync thresholds $\{Q_{out}, Q_{in}\}$ involves a UE determining the out-of-sync and in-sync thresholds $\{Q_{out}, Q_{in}\}$ for the normal coverage, while the eNB informs the UE of the additional offset for the out-of-sync and in-sync thresholds $\{Q_{out}, Q_{in}\}$ under enhanced coverage levels. Exemplary method 1 is discussed in the context of FIG. 6A and FIG. 6B.

Figure 6A:
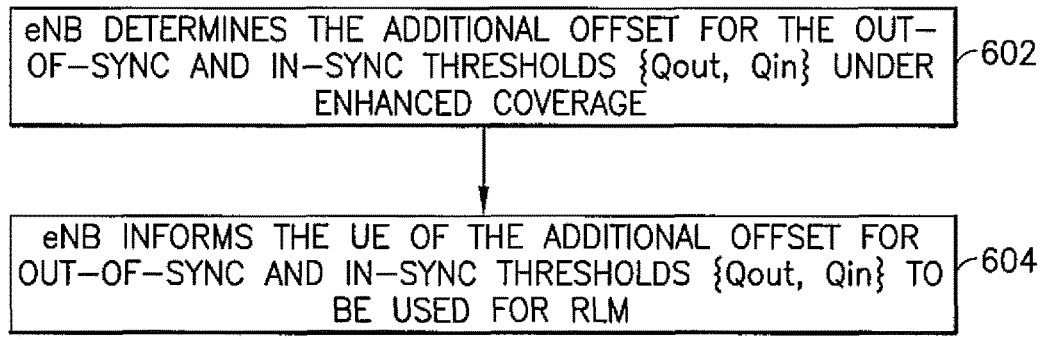
FIGS. 6A and 6B are logic flow diagrams for radio link monitoring methods for wireless systems with multiple coverage levels, and illustrate the operation of an exemplary method, a result of execution of computer program instructions embodied on a computer readable memory, functions performed by logic implemented in hardware, and/or interconnected means for performing functions in accordance with exemplary embodiments.

FIG. 6A is a logic flow diagram for actions taken in eNB for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the ZZZ module 150 may include multiples ones of the blocks in FIG. 6A, where each included block is an interconnected means for performing the function in the block. The blocks in FIG. 6A are assumed to be performed by a base station such as eNB 170, e.g., under control of the ZZZ module 150 at least in part.

Block 602 represents the eNB determining the additional offset for the out-of-sync and in-sync thresholds $\{Q_{out}, Q_{in}\}$ under enhanced coverage.

In block 604, the eNB is represented as informing the UE of the additional offset for out-of-sync and in-sync thresholds $\{Q_{out}, Q_{in}\}$ to be used for RLM.

Figure 6B:
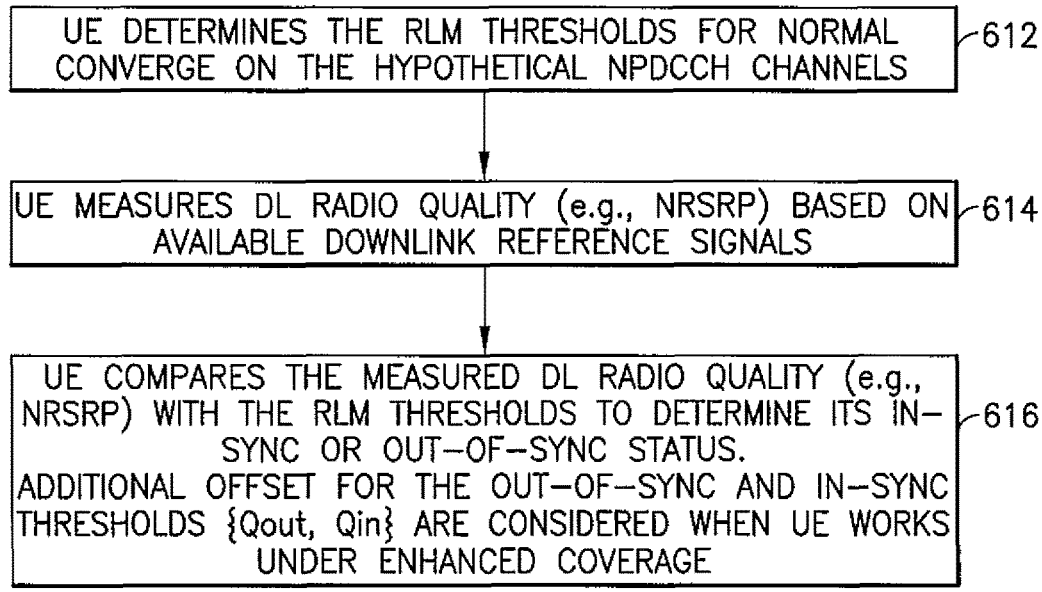

FIG. 6B is a logic flow diagram for actions performed in UE for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 6B, where each included block is an interconnected means for performing the function in the block. The blocks in FIG. 6B are assumed to be performed by the UE 110, e.g., under control of the YYY module 140 at least in part.

Block 612 represents the UE determining the RLM thresholds for normal converge on the hypothetical NPD-CCH channels.

In block 614, the UE is represented as measuring DL radio quality (e.g., NRSRP) based on available downlink reference signals.

Block 616 represents the UE comparing the measured downlink radio quality (e.g., NRSRP) with the RLM thresholds to determine its in-sync or out-of-sync status. Additional offset for the out-of-sync and in-sync thresholds $\{Q_{out}, Q_{in}\}$ are considered when UE works under enhanced coverage.

And finally, an exemplary method, designated herein as exemplary method 4, for the determination of RLM out-of-sync and in-sync thresholds $\{Q_{out}, Q_{in}\}$ involves a UE determining the out-of-sync threshold $Q_{out}$ for the normal and/or enhanced coverage, while eNB informs the UE of the additional offset for in-sync thresholds $Q_{in}$ under that coverage level. Exemplary method 1 is discussed in the context of FIG. 7A and FIG. 7B.

Figure 7A:
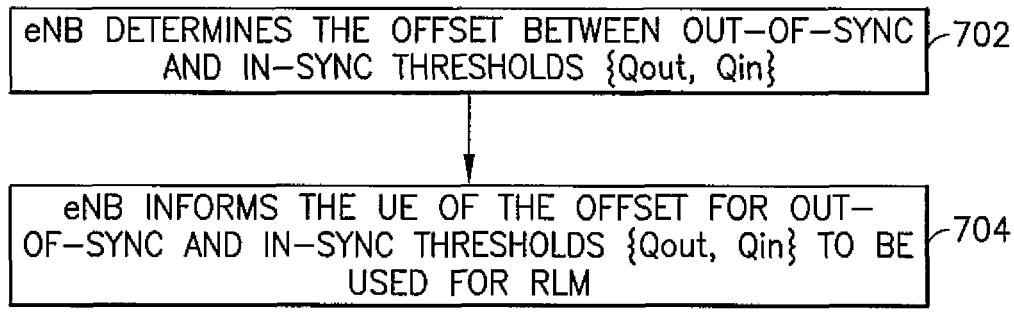
FIGS. 7A and 7B are logic flow diagrams for radio link monitoring methods for wireless systems with multiple coverage levels, and illustrate the operation of an exemplary method, a result of execution of computer program instructions embodied on a computer readable memory, functions performed by logic implemented in hardware, and/or interconnected means for performing functions in accordance with exemplary embodiments.

FIG. 7A is a logic flow diagram for actions taken in eNB for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the ZZZ module 150 may include multiples ones of the blocks in FIG. 7A, where each included block is an interconnected means for performing the function in the block. The blocks in FIG. 7A are assumed to be performed by a base station such as eNB 170, e.g., under control of the ZZZ module 150 at least in part.

Block 702 represents the eNB determining the offset between out-of-sync and in-sync thresholds $\{Q_{out}, Q_{in}\}$.

In block 704, the eNB is represented as informing the UE of the offset for out-of-sync and in-sync thresholds $\{Q_{out}, Q_{in}\}$ to be used for RLM.

Figure 7B:
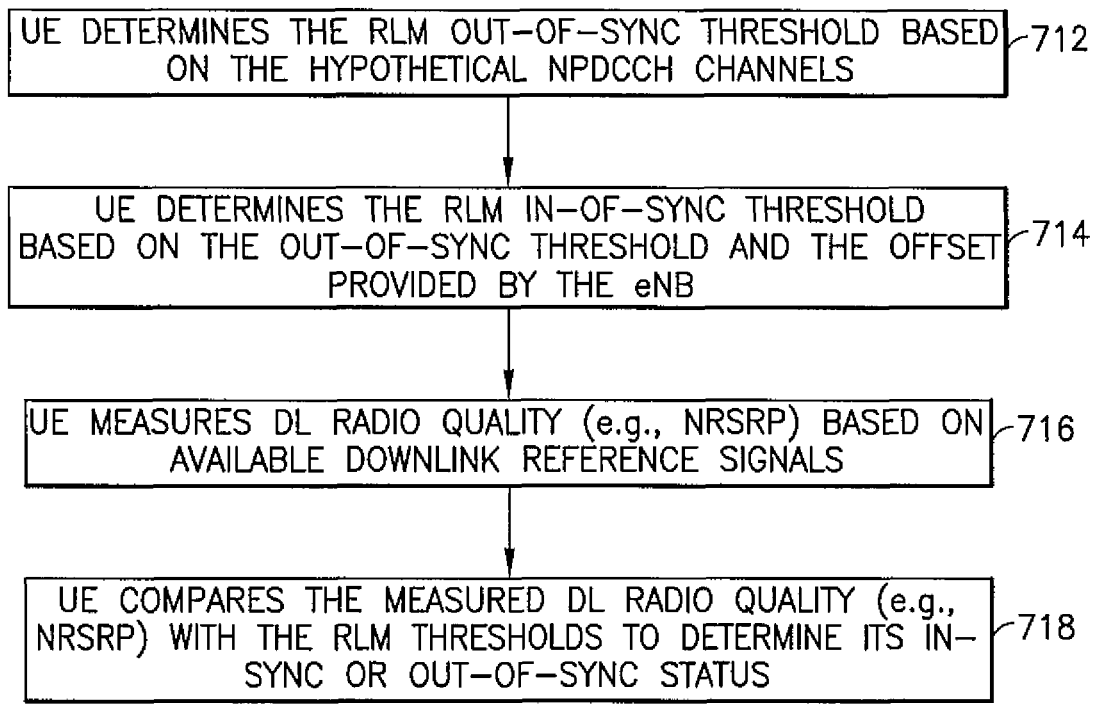

FIG. 7B is a logic flow diagram for actions performed in UE for RLM illustrating the operation of an exemplary method, a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 7B, where each included block is an interconnected means for performing the function in the block. The blocks in FIG. 7B are assumed to be performed by the UE 110, e.g., under control of the YYY module 140 at least in part.

Block 712 represents the UE determining the RLM out-of-sync threshold based on the hypothetical NPDCCH channels.

In block 714, the UE is represented as determining the RLM in-of-sync threshold based on the out-of-sync threshold and the offset provided by the eNB.

Block 716 represents the UE measuring DL radio quality (e.g., NRSRP) based on available downlink reference signals.

And block 718 represents the UE comparing the measured downlink radio quality (e.g., NRSRP) with the RLM thresholds to determine its in-sync or out-of-sync status.

A combination of the above methods may also be considered for the determination of the out-of-sync and in-sync thresholds $\{Q_{out}, Q_{in}\}$ for RLM. For exemplary methods 2 to 4, the eNB may adjust the RLM thresholds based on network conditions in real time.

Regarding an estimation of downlink radio quality, a UE performs the estimation of the DL quality based on the combined signals (for example, combining the signal used using 'repetition' level amount of signals—whether this signal is NRS, NSSS, or similar).

Without in any way limiting the scope, interpretation, or application of the claims appearing below, a technical effect or advantage of one or more of the example embodiments disclosed herein of the Method 1 is avoiding RLM performance degradation in current NB-IoT RLM.

Without in any way limiting the scope, interpretation, or application of the claims appearing below, a technical effect or advantage of one or more of the example embodiments disclosed herein of the Method 2 is it avoids the complexity in UE side to derive the out-of-sync and in-sync thresholds $\{Q_{out}, Q_{in}\}$ based on the configured NPDCCH parameters. Another technical effect or advantage of one or more of the example embodiments disclosed herein of the Method 2 is it helps avoiding the inconsistency among UEs where different implementation methods may be used to derive the out-of-sync and in-sync thresholds $\{Q_{out}, Q_{in}\}$ based on the configured NPDCCH parameters. Another technical effect or advantage of one or more of the example embodiments disclosed herein of the Method 2 is it gives the eNB the freedom to directly control the coverage level for a UE instead of using NPDCCH parameters to implicitly control the coverage level for the UE.

Without in any way limiting the scope, interpretation, or application of the claims appearing below, a technical effect or advantage of one or more of the example embodiments disclosed herein of the Method 3 is it allows the UE to determine the out-of-sync and in-sync thresholds $\{Q_{out}, Q_{in}\}$ for normal coverage based on fixed NPDCCH parameters without the need to consider various factors associated with the coverage enhancement. Another technical effect or advantage of one or more of the example embodiments disclosed herein of the Method 3 is it allows the eNB to control the coverage enhancement level in comparison with the normal coverage.

Without in any way limiting the scope, interpretation, or application of the claims appearing below, a technical effect or advantage of one or more of the example embodiments disclosed herein of the Method 4 is it allows the UE to determine the out-of-sync threshold $Q_{out}$ for normal or enhanced coverage based on its implementation, which may make the thresholds more suitable for the UE's implementation, while allows the eNB to control the condition for a UE to come back to in-sync status in order to avoid the situation that once a UE enters out-of-sync status, it may no longer be able to enter the in-sync status, which is one of the main issues in current NB-IoT RLM.

Figure 8:
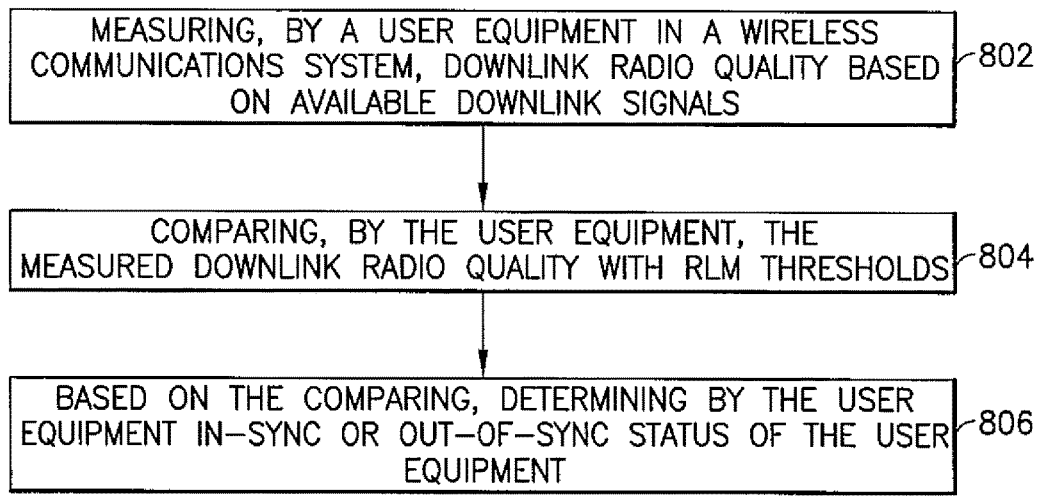
FIG. 8 is a logic flow diagram for a radio link monitoring method for wireless systems with multiple coverage levels, and illustrates the operation of an exemplary method, a result of execution of computer program instructions embodied on a computer readable memory, functions performed by logic implemented in hardware, and/or interconnected means for performing functions in accordance with exemplary embodiments.

Thus, we have developed the current invention, an example of an embodiment of which can be referred to as item 1, which is a method that comprises a user equipment in a wireless communications system measuring downlink radio quality based on available downlink signals; comparing the measured downlink radio quality with RLM thresholds; and determining its in-sync or out-of-sync status based on that comparison. An example of this embodiment is also shown in FIG. 8, where block 802 represents measuring, by a user equipment in a wireless communications system, downlink radio quality based on available downlink signals, block 804 represents comparing, by the user equipment, the measured downlink radio quality with RLM thresholds, and block 806 represents, based on the comparing, determining by the user equipment in-sync or out-of-sync status of the user equipment.

An example of a further embodiment, which can be referred to as item 2, is the method of item 1, further comprising, prior to the measuring, the user equipment determines the RLM thresholds based on hypothetical NPDCCH channels, where the hypothetical NPDCCH channels are defined based on all configured NPDCCH parameters. This embodiment relates to the Method 1 referred to above.

An example of a further embodiment, which can be referred to as item 3, is the method of item 1, further comprising, prior to the measuring, the user equipment receiving from a base station in-sync and out-of-sync thresholds to be used for the RLM, where the in-sync and out-of-sync thresholds were determined by the base station for in-sync and out-of-sync thresholds for all coverage enhancement levels, or only the in-sync and out-of-sync thresholds for the configured coverage enhancement level for the UE. This embodiment relates to the Method 2 referred to above.

An example of a further embodiment, which can be referred to as item 4, is the method of item 1, further comprising, prior to the measuring, the user equipment receiving from a base station an additional offset for in-sync and out-of-sync thresholds under enhanced coverage, where the determining by the user equipment in-sync or out-of-sync status comprises considering the additional offset when the user equipment works under enhanced coverage; and determining by the user equipment the RLM thresholds for normal converge on the hypothetical NPDCCH channels. This embodiment relates to the Method 3 referred to above.

An example of a further embodiment, which can be referred to as item 5, is the method of item 1, further comprising, prior to the measuring, the user equipment receiving from a base station an offset between in-sync and out-of-sync thresholds; and the user equipment determining the RLM out-of-sync threshold based on the hypothetical NPDCCH channels and the RLM in-of-sync threshold based on the out-of-sync threshold and the offset provided by the base station. This embodiment relates to the Method 4 referred to above.

An example of a further embodiment, which can be referred to as item 6, is the method of any of items 1 through 5, further comprising prior to the measuring, the user equipment measuring downlink radio quality, determining NPRACH coverage level based on downlink radio quality, and transmitting to the network a random access preamble with a resource corresponding to NPRACH coverage level for the network to configure NPDCCH parameters.

An example of a further embodiment, which can be referred to as item 7, is the method of any of items 1 through 6, wherein the downlink radio quality comprises NRSRP.

An example of another embodiment of current invention, which can be referred to as item 8, is an apparatus that comprises at least one processor and at least one memory including computer program code, such that the at least one memory and the computer program code are configured, with the at least one processor, to cause the apparatus to perform at least the measuring downlink radio quality based on available downlink signals, comparing the measured downlink radio quality with RLM thresholds, and based on the comparing, determining its in-sync or out-of-sync status based on the comparison.

An example of a further embodiment, which can be referred to as item 9, is the apparatus of item 8, where the at least one memory and the computer program code are further configured, with the at least one processor, to cause the apparatus to perform at least, prior to the measuring, determining the RLM thresholds based on hypothetical NPDCCH channels, where the hypothetical NPDCCH channels are defined based on all configured NPDCCH parameters.

An example of a further embodiment, which can be referred to as item 10, is the apparatus of item 8, where the at least one memory and the computer program code are further configured, with the at least one processor, to cause the apparatus to perform at least, prior to the measuring, receiving from a base station in-sync and out-of-sync thresholds to be used for the RLM, where the in-sync and out-of-sync thresholds were determined by the base station for in-sync and out-of-sync thresholds for all coverage enhancement levels or only the in-sync and out-of-sync thresholds for the configured coverage enhancement level for the apparatus.

An example of a further embodiment, which can be referred to as item 11, is the apparatus of item 8, where the at least one memory and the computer program code are further configured, with the at least one processor, to cause the apparatus to perform at least, prior to the measuring, receiving from a base station an additional offset for in-sync and out-of-sync thresholds under enhanced coverage, where the determining in-sync or out-of-sync status comprises considering the additional offset when the apparatus works under enhanced coverage, and determining the RLM thresholds for normal converge on the hypothetical NPDCCH channels.

An example of a further embodiment, which can be referred to as item 12, is the apparatus of item 8, where the at least one memory and the computer program code are further configured, with the at least one processor, to cause the apparatus to perform at least, prior to the measuring, receiving from a base station an offset between in-sync and out-of-sync thresholds and determining the RLM out-of-sync threshold based on the hypothetical NPDCCH channels and determining the RLM in-of-sync threshold based on the out-of-sync threshold and the offset provided by the base station.

An example of a further embodiment, which can be referred to as item 13, is the apparatus of any of items 8 through 12, where the at least one memory and the computer program code are further configured, with the at least one processor, to cause the apparatus to perform at least, prior to the measuring, doing an initial measurement of downlink radio quality, making a determination of NPRACH coverage level based on downlink radio quality, and transmitting to the network a random access preamble with a resource corresponding to NPRACH coverage level for the network to configure NPDCCH parameters.

An example of a further embodiment, which can be referred to as item 14, is the apparatus of any of items 8 through 13, where the downlink radio quality comprises NRSRP.

An example of a further embodiment, which can be referred to as item 15, is the apparatus of any of items 8 through 14, where the apparatus comprises a user equipment.

An example of another embodiment of the present invention, which can be referred to as item 16, is an apparatus comprising means for performing the methods of any of the previously enumerated embodiments in items 1 through 7 above.

An example of a further embodiment of the present invention, which can be referred to as item 17, is a wireless communication system which includes the apparatus of any of the previously enumerated embodiments in items 8 through 16 above.

In another example of an embodiment of the present invention, which can be referred to as item 18, a computer program comprises program code for executing a method according to any of items 1 to 7. A further example of an embodiment of the present invention, which can be referred to as, item 19, is the computer program according to this paragraph, wherein a computer program product comprises a computer-readable medium bearing the computer program code embodied therein for use with a computer, wherein the computer program code comprises code that when executed by the computer at least performs or controls a method according to any of items 1 to 7. Yet another example of an embodiment of the present invention, which can be referred to as item 20, is the computer program product of this paragraph where the computer-readable medium is non-transitory.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media.

In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

BLER block error rate
CE coverage enhancement
CRS cell reference signal
eNB (or eNodeB) evolved Node B (e.g., an LTE base station)
I/F interface
IoT Internet of Things
LTE long term evolution
MCS modulation and coding scheme
MTC machine type communication
MME mobility management entity
mMTC massive MTC
NB narrow band
NB-IoT narrow band IoT (internet of things)
NCE network control element
NPDCCH NB-IoT physical downlink control channel
NPRACH NB-IoT PRACH
NRS NB-RS (NB-IoT reference signal)
NRSRP NB-IoT RSRP
N/W network
PRACH physical random access channel
RLF radio link failure
RLM radio link monitoring
RRH remote radio head
RSRP reference signal received power
Rx receiver
SGW serving gateway
SNR signal to noise ratio
Tx transmitter
UE user equipment (e.g., a wireless, typically mobile device)

What is claimed is:

1. A method comprising:
determining, by a user equipment, narrow band internet of things physical random access channel (NPRACH) coverage level based on downlink radio quality;
transmitting, by the user equipment to a network, a random access preamble with a resource corresponding to NPRACH coverage level for the network to configure narrow band internet of things physical downlink control channel (NPDCCH) parameters;
determining by the user equipment the radio link monitoring (RLM) thresholds based on hypothetical NPDCCH channels, wherein the hypothetical NPDCCH channels are defined based on all configured NPDCCH parameters;
measuring, by the user equipment in a wireless communications system, downlink radio quality based on available downlink signals;
comparing, by the user equipment, the measured downlink radio quality with RLM thresholds; and
based on the comparing, determining by the user equipment in-sync or out-of-sync status of the user equipment.

2. The method of claim 1, further comprising prior to the measuring:
receiving by the user equipment from a base station in-sync and out-of-sync thresholds to be used for the RLM, wherein the in-sync and out-of-sync thresholds were determined by the base station for
in-sync and out-of-sync thresholds for all coverage enhancement levels, or
only the in-sync and out-of-sync thresholds for the configured coverage enhancement level for the user equipment.

3. The method of claim 1, further comprising prior to the measuring:
receiving by the user equipment from a base station an additional offset for in-sync and out-of-sync thresholds under enhanced coverage, wherein the determining by the user equipment in-sync or out-of-sync status comprises considering the additional offset when the user equipment works under enhanced coverage; and
determining by the user equipment the RLM thresholds for normal converge on the hypothetical NPDCCH channels.

4. The method of claim 1, further comprising prior to the measuring:
receiving by the user equipment from a base station an offset between in-sync and out-of-sync thresholds; and
determining by the user equipment:
the RLM out-of-sync threshold based on the hypothetical NPDCCH channels, and
the RLM in-of-sync threshold based on the out-of-sync threshold and the offset provided by the base station.

5. The method of claim 1, wherein the downlink radio quality comprises narrow band internet of things reference signal received power (NRSRP).

6. An apparatus, comprising:
at least one processor; and
at least one memory including computer program code, wherein the at least one memory and the computer program code are configured, with the at least one processor, to cause the apparatus to perform at least the following:
determining NPRACH coverage level based on downlink radio quality;
transmitting to a network, a random access preamble with a resource corresponding to NPRACH coverage level for the network to configure NPDCCH parameters;
determining the RLM thresholds based on hypothetical NPDCCH channels, wherein the hypothetical NPDCCH channels are defined based on all configured NPDCCH parameters;
measuring downlink radio quality based on available downlink signals;
comparing the measured downlink radio quality with RLM thresholds; and
based on the comparing, determining in-sync or out-of-sync status of the apparatus.

7. The apparatus of claim 6, wherein the at least one memory and the computer program code are further configured, with the at least one processor, to cause the apparatus to perform at least the following prior to the measuring:
receiving, from a base station, in-sync and out-of-sync thresholds to be used for the RLM, wherein the in-sync and out-of-sync thresholds were determined by the base station for
in-sync and out-of-sync thresholds for all coverage enhancement levels, or
only the in-sync and out-of-sync thresholds for the configured coverage enhancement level for the apparatus.

8. The apparatus of claim 6, wherein the at least one memory and the computer program code are further configured, with the at least one processor, to cause the apparatus to perform at least the following prior to the measuring:
receiving, from a base station, an additional offset for in-sync and out-of-sync thresholds under enhanced coverage, wherein the determining in-sync or out-of-sync status comprises considering the additional offset when the apparatus works under enhanced coverage; and
determining the RLM thresholds for normal converge on the hypothetical NPDCCH channels.

9. The apparatus of claim 6, wherein the at least one memory and the computer program code are further configured, with the at least one processor, to cause the apparatus to perform at least the following prior to the measuring:
- receiving, from a base station, an offset between in-sync and out-of-sync thresholds; and
- determining:
  - the RLM out-of-sync threshold based on the hypothetical NPDCCH channels, and
  - the RLM in-of-sync threshold based on the out-of-sync threshold and the offset provided by the base station.

10. The apparatus of claim 6, wherein the downlink radio quality comprises NRSRP.

11. The apparatus of claim 6, wherein the apparatus comprises a user equipment.

12. A non-transitory computer-readable memory comprising computer program code embodied therein for use with a computer, wherein the computer program code comprises code that when executed by the computer at least performs or controls:
- determining, by a user equipment NPRACH coverage level based on downlink radio quality;
- transmitting, by the user equipment to a network, a random access preamble with a resource corresponding to NPRACH coverage level for the network to configure NPDCCH parameters;
- determining by the user equipment the RLM thresholds based on hypothetical NPDCCH channels, wherein the hypothetical NPDCCH channels are defined based on all configured NPDCCH parameters;
- measuring, by the user equipment in a wireless communications system, downlink radio quality based on available downlink signals;
- comparing by the user equipment of the measured downlink radio quality with RLM thresholds; and
- based on the comparing, determining by the user equipment in-sync or out-of-sync status of the user equipment.

13. The non-transitory computer-readable memory of claim 12, wherein the computer program code further comprises code that when executed by the computer at least performs or controls prior to the measuring:
- receiving, by the user equipment from a base station, in-sync and out-of-sync thresholds to be used for the RLM, wherein the in-sync and out-of-sync thresholds were determined by the base station for
- in-sync and out-of-sync thresholds for all coverage enhancement levels, or
- only the in-sync and out-of-sync thresholds for the configured coverage enhancement level for the LB user equipment.

14. The non-transitory computer-readable memory of claim 12, wherein the computer program code further comprises code that when executed by the computer at least performs or controls prior to the measuring:
- receiving, by the user equipment from a base station, an additional offset for in-sync and out-of-sync thresholds under enhanced coverage, wherein the determining by the user equipment in-sync or out-of-sync status comprises considering the additional offset when the user equipment works under enhanced coverage; and
- determining by the user equipment the RLM thresholds for normal converge on the hypothetical NPDCCH channels.

15. The non-transitory computer-readable memory of claim 12, wherein the computer program code further comprises code that when executed by the computer at least performs or controls prior to the measuring:
- receiving, by the user equipment from a base station, an offset between in-sync and out-of-sync thresholds; and
- determining by the user equipment:
  - the RLM out-of-sync threshold based on the hypothetical NPDCCH channels, and
  - the RLM in-of-sync threshold based on the out-of-sync threshold and the offset provided by the base station.

* * * * *